United States Patent [19]
Burns et al.

[11] Patent Number: 5,974,058
[45] Date of Patent: Oct. 26, 1999

[54] SYSTEM AND METHOD FOR MULTIPLEXING SERIAL LINKS

[75] Inventors: William Burns; Michael Lucas, both of Boulder, Colo.

[73] Assignee: Storage Technology Corporation, Louisville, Colo.

[21] Appl. No.: 09/039,890

[22] Filed: Mar. 16, 1998

[51] Int. Cl.[6] .................................................. H04J 3/22
[52] U.S. Cl. ........................................... 370/538; 370/366
[58] Field of Search ..................................... 370/537, 538, 370/539, 545, 914, 366, 230, 235, 236; 709/233, 234

[56] References Cited

U.S. PATENT DOCUMENTS

| | | | |
|---|---|---|---|
| 4,759,014 | 7/1988 | Decker et al. | 370/503 |
| 5,867,543 | 2/1999 | Roberts et al. | 375/365 |
| 5,903,616 | 5/1999 | Rangan et al. | 370/354 |

*Primary Examiner*—Alpus H. Hsu
*Assistant Examiner*—Mitchell Slavitt
*Attorney, Agent, or Firm*—Brooks & Kushman P.C.

[57] ABSTRACT

A plurality of transmitters are multiplexed to a hub through clocked serial links. Timing problems that may arise when switching between links are eliminated with a system including a group serial receiver for each link for performing serial to parallel conversion of data sent over the serial link, outputting a group clock signal based on the serial clock signal, outputting parallel data clocked by the group clock signal, and determining a data enable signal from the serial link. A select signal for determining the serial link being read by the hub selects the corresponding group clock, parallel data, and data enable. A load control clocks the selected parallel data into a first-in, first-out buffer using the selected group clock when the selected data enable is asserted. When the selected data enable is not asserted, the load control is held in reset and, hence, is insensitive to irregularities in the selected clock signal due to switching between links. Data is clocked from the buffer by a local clock.

10 Claims, 4 Drawing Sheets

SYSTEM AND METHOD FOR MULTIPLEXING SERIAL LINKS

TECHNICAL FIELD

The present invention relates to multiplexing a plurality of serial links, each link clocked by a non-synchronous clock.

BACKGROUND ART

A hub is required to receive data from one of many high-speed serial transmitters, each transmitter clocked asynchronously from other transmitters. Such a hub may be used, for example, in a direct access storage device (DASD) controller in a computer system, where transmitters are adapters linking computer elements such as processors and disk arrays, to a cache by way of the hub. Data is clocked into the hub by the currently selected transmitter. When a different transmitter is switched to transmit, a glitch may occur in the incoming clock. This glitch may cause problems within the hub including unwanted state changes and missed or repeated data.

Current solutions to the problem require a memory buffer for each transmission line in the hub. Data is clocked into a buffer by the transmitter clock and clocked out of the buffer by a clock generated in the hub. In this way, the hub clock does not experience glitches when switching between transmitters. A problem with these solutions is the cost of placing a buffer on each incoming serial channel. system and method are needed that can multiplex a set of incoming serial channels, each with a separate clock, without causing a glitch in the hub and without the cost of a buffer for each channel.

SUMMARY OF THE INVENTION

It is a primary object of the present invention to multiplex a set of serial channels in a hub in a manner that prohibits clock glitches.

Another object of the present invention is to require only one memory buffer to prevent clock glitches in a hub linked to multiple asynchronous serial transmitters.

Still another object of the present invention is to reduce the cost of a hub linked to multiple asynchronous serial transmitters.

In carrying out the above objects and other objects and features of the present invention, a system is provided for multiplexing serial links. Each link connects one of the transmitters to a hub and includes one or more serial channels and a serial clock signal. Serial data is clocked on each serial channel of a link by the serial clock signal. The system includes a select signal for determining which of the plurality of serial links is being read by the hub. The system also includes a group serial receiver connected to a corresponding serial link, each group serial receiver performs serial to parallel conversion of data sent over the serial link, outputs a group clock signal based on the serial clock signal, outputs parallel data clocked by the group clock signal, the parallel data representing the converted serial data, and determines a data enable signal from the serial link, the data enable signal indicating active data on the serial link. A first multiplexer outputs selected data as the parallel data of the group serial receiver corresponding to the value of the select signal. A second multiplexer outputs a selected clock signal as the group clock signal of the group serial receiver corresponding to the value of the select signal. A third multiplexer outputs a selected data enable signal as the data enable signal of the group serial receiver corresponding to the value of the select signal. Additionally, a load control latches the selected data and outputs the selected data clocked by the selected clock signal if the selected data enable signal is asserted, otherwise the load control is held in reset. A local clock produces a local clock signal not synchronized with the selected clock signal. A first-in, first-out buffer loads the latched data clocked by the selected clock signal and unloads the selected data clocked by the local clock signal.

In one embodiment, each of the transmitters can send frame information to the hub. Each group serial receiver can detect when frame information has been sent and can generate a frame command. A first control logic may output a parallel word corresponding to the frame command.

In another embodiment, a second control logic reads a sequence of data words from the buffer and forms a wide parallel data word.

In still another embodiment, the second control logic performs error detection and correction of the wide parallel data word.

A method is also provided in accordance with the present invention for multiplexing serial links including, for each link, determining a parallel data signal corresponding to the serial data sent on the one or more serial channels and determining a group clock signal with a period equal to a multiple of periods of the serial clock signal, selecting a serial link to be read by the hub, determining a selected data signal as the parallel data signal from the selected serial link, determining a selected clock signal as the group clock signal from the selected serial link, loading the selected data signal into a buffer using the selected clock signal, generating a local clock signal, and unloading the selected data signal from the buffer using the local clock signal.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
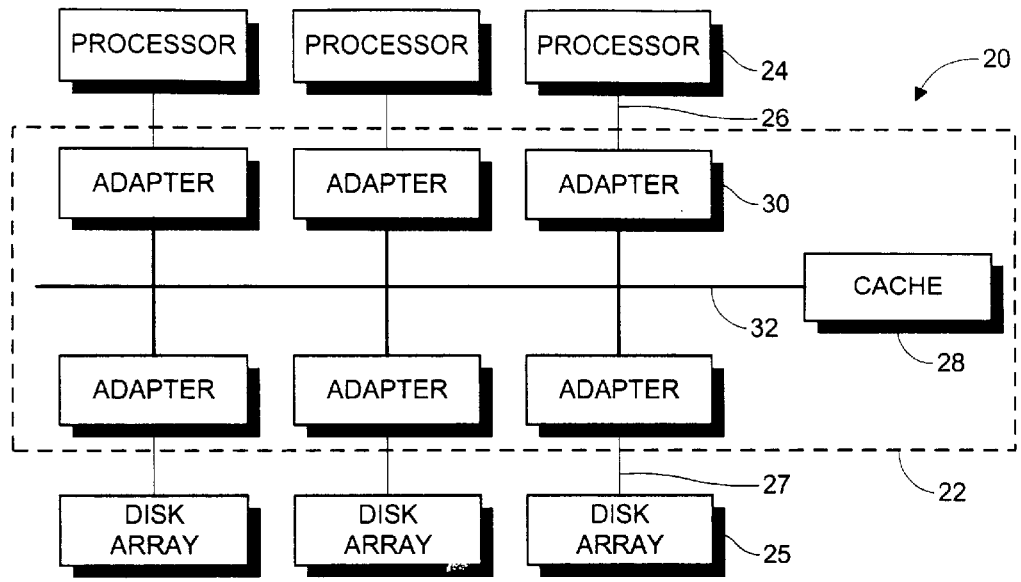
FIG. 1 is a block diagram of a computer system having a DASD controller with a parallel bus architecture.

Referring now to FIG. 1, a block diagram of a computer system having a DASD controller with a traditional parallel bus architecture is shown. Parallel bus computer system 20 includes parallel bus DASD controller 22, processors 24 and disk arrays 25. Processor 24 may be connected to parallel bus DASD controller 22 through processor bus 26 such as SCSI (Small Computer System Interface), ESCON (Enterprise System Connection), HIPPI (High Performance Parallel Interface), Fiber Channel, or FIPS (Federal Information Processing Standard). Disk array 25 may be connected to parallel bus DASD controller 22 through disk array bus 27 such as SCSI or Fiber Channel. Although three processors, three disk arrays, and six adapters are shown, any number of processors and disk arrays together with their associated adapters are possible in computer system 20.

Parallel bus DASD controller 22 contains parallel cache 28. A cache is a large memory system accessible by processor 24 or disk array 25. Parallel adapter 30 is operative to interface with processor 24 or disk array 25 through processor bus 26 or disk array bus 27 respectively and thereby access cache 28 using parallel bus 32.

Figure 2:
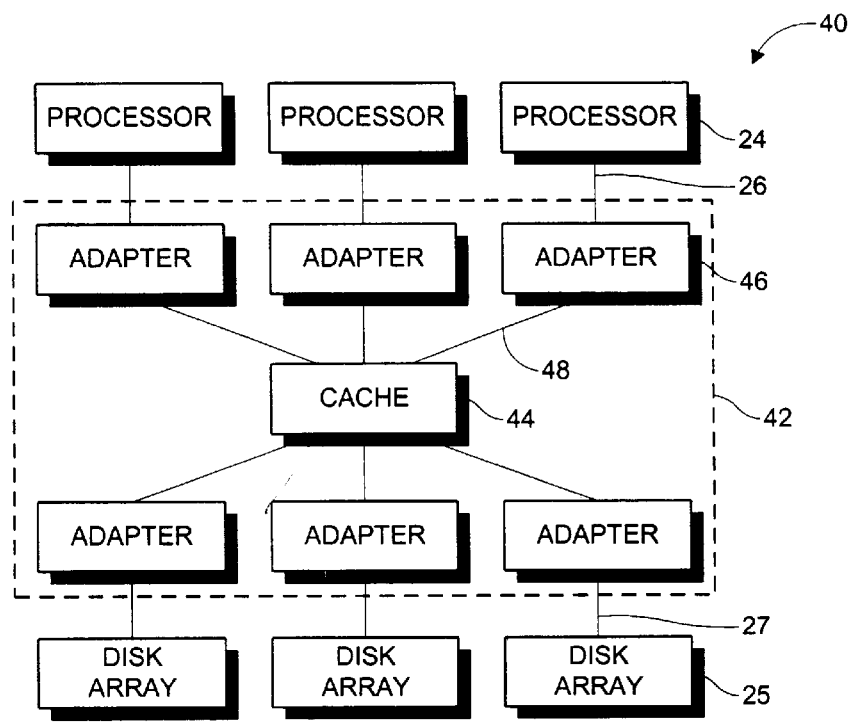
FIG. 2 is a block diagram of a computer system having a DASD controller with a serial link architecture.

Referring now to FIG. 2, a block diagram of a computer system having a serial link DASD controller is shown. Serial link computer system 40 includes the same processors 24, disk arrays 25, processor buses 26 and disk array buses 27 as in parallel computer system 20. However, serial link DASD controller 42 is substituted for parallel DASD controller 22. Although three processors, three disk arrays, and six adapters are shown, any number of processors and disk arrays together with their associated adapters are possible in computer system 40.

DASD controller 42 contains serial cache 44. Serial adapter 46 provides the interface between processor 24 or disk array 25 and cache 44, connected through processor bus 26 or disk array bus 27 respectively and adapter 46. A performance increase will occur by replacing parallel bus 32 with bidirectional multichannel serial link 48 between each adapter 46 and cache 44.

Figure 3:
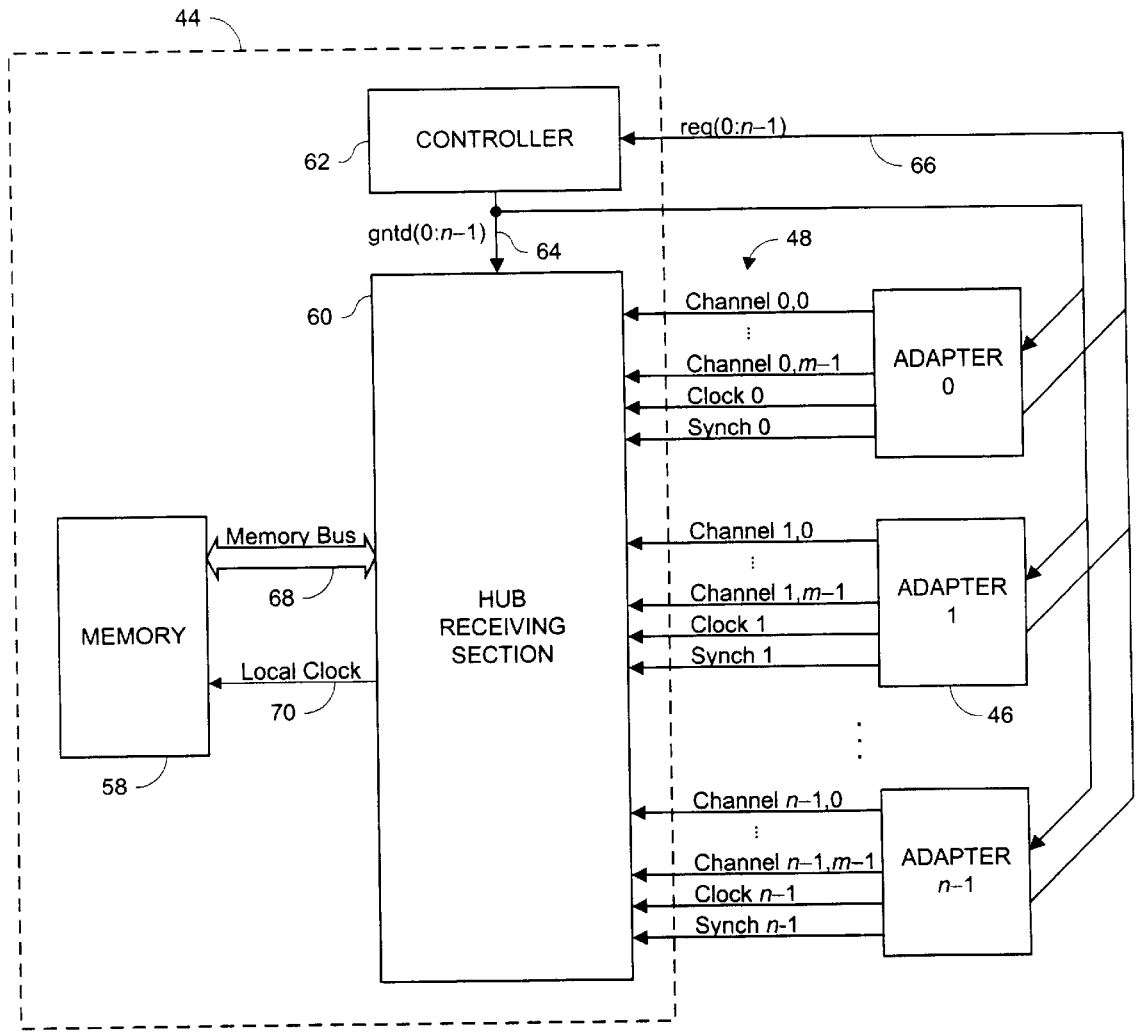
FIG. 3 is a block diagram of a serial hub subsystem with multiple adapters.

Referring now to FIG. 3, a block diagram of a serial hub subsystem with multiple adapters is shown. Cache 44 includes memory 58, hub receiving section 60, and controller 62. Cache 44 is connected to each of n adapters 46 through a corresponding serial data link 48, selection signal 64, and request signal 66.

Hub receiving section 60 receives a selection signal 64, labeled gntd(0:n−1), from controller 62 indicating which adapter 46 has been granted access. Once access has been granted, adapter 46 transmits information and causes a data enable signal to become activated on the selected serial link 48. The value of selection signal 64 is decided by controller 62 based on received requests for access. A request may be generated by adapter 46. Various arbitration techniques may be used with the present invention. In this example, requests are represented generally by request signal 66, labeled req(0:n−1).

Each serial data link 48 for each adapter 46 includes m serial channels and a serial clock for clocking data on each channel. Serial link clocks for each serial link 48 have the same frequency but each may have a different relative phase shift. In a preferred embodiment, each link has three serial channels. The signal indicating when data is enabled is coded into the three channels. Serial link 48 may also include one or more additional control lines, labeled as Synch, which may be used to transmit frame information.

Hub receiving section 60 produces parallel data words corresponding to the serial signal received from the selected adapter and outputs these parallel data words on memory bus 68 to memory 58. Hub 60 also generates local clock 70, free of glitches, for clocking the output parallel data words.

Figure 4:
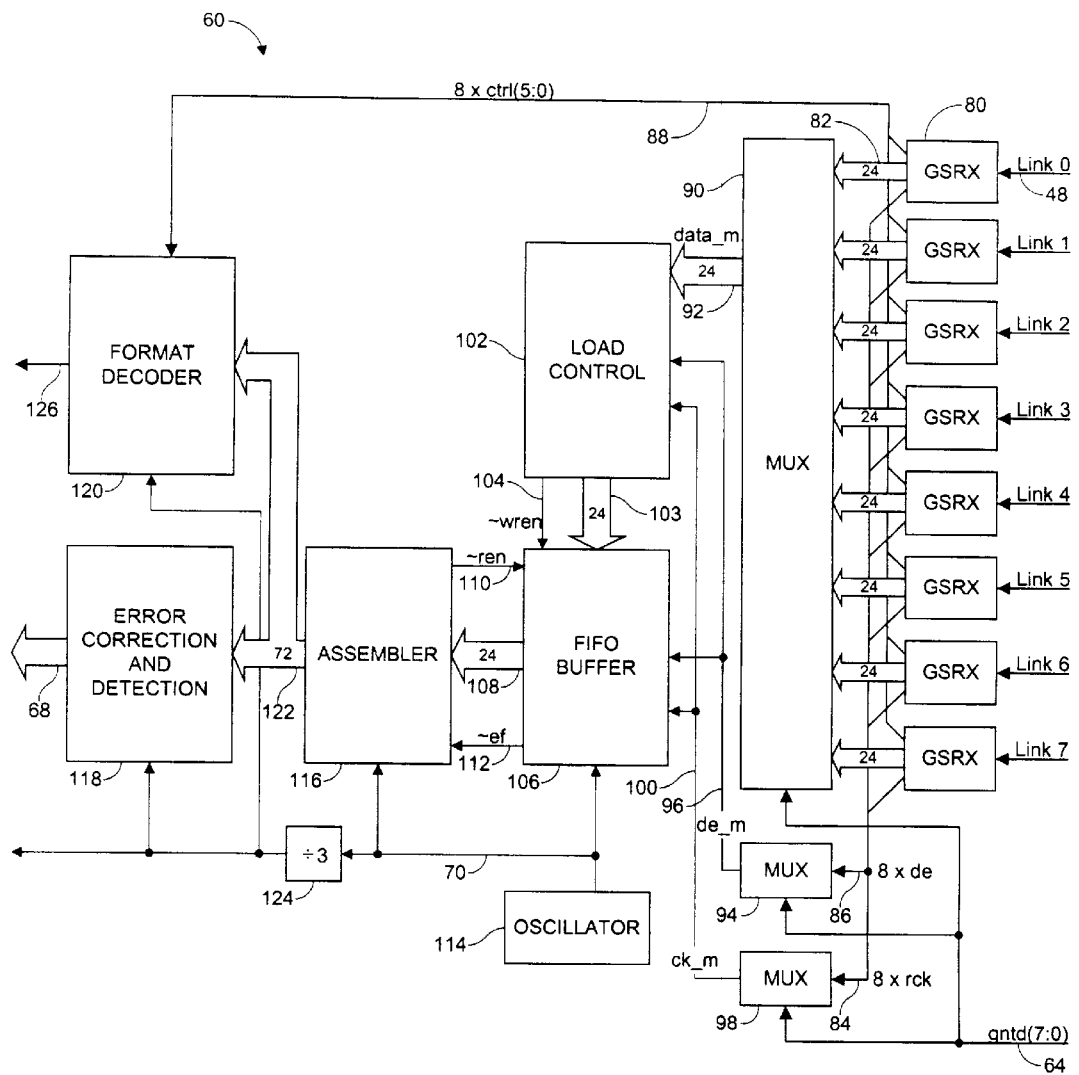
FIG. 4 is a schematic diagram of an illustrative system according to the present invention.

Referring now to FIG. 4, a schematic diagram of an illustrative system for implementing the present invention is shown. The system is part of hub receiving section 60 described with regards to FIG. 3 above. The system accepts eight serial data links 48 and selection signal 64, and outputs a 72-bit parallel data word on memory bus 68 corresponding to input received on a selected link.

Serial data link 48 connects to a corresponding group serial receiver 80. Group serial receiver 80 converts the serial data streams in link 48 into parallel data 82. Group serial receiver 80 outputs group clock signal 84, used to clock parallel data 82, recovered from the corresponding serial link clock. Group serial receiver 80 further develops data enable signal 86 indicating when parallel data 82 is valid.

In a preferred embodiment, group serial receiver 80 is still further operative to recognize what information is sent on link 48 and can thereby indicate a frame command. Possible frame commands include read request, in which the request frame indicates a read memory location followed by a read frame which contains the data at the memory location, write, diagnostics, and status. Frame commands are output on frame command bus 88.

For the illustrative system shown in FIG. 4, each of the eight group serial receivers 80 outputs 24-bit parallel data 82, data enable signal 86, labeled de, group clock signal 84, labeled rck, and a 6-bit control word indicating the frame command, labeled ctrl(5:0), on frame command bus 88.

Three multiplexers (MUX) select which data word 82, enable signal 86 and group clock signal 84 are forwarded based on the adapter granted to transmit. Data multiplexer 90 accepts data words 82 from each group serial receiver 80 and outputs the selected data 92, labeled data_m, corresponding to the link number of the granted adapter on selection signal 64. Data enable multiplexer 94 accepts a data enable signal from each group serial receiver 80 and outputs the selected data enable signal 96, labeled de_m, corresponding to the link number of the granted adapter on selection signal 64. Clock multiplexer 98 accepts clock signals 84 from each group serial receiver 80 and outputs the selected clock signal 100, labeled ck_m, corresponding to the link number of the granted adapter on selection signal 64. The term multiplexer refers to a controlled switch. In a preferred embodiment, multiplexers 90, 94 and 98 are implemented using cross-bar switches to minimize skew.

Load control 102 accepts selected data enable 96 and selected clock 100 and generates latched data 103 and write enable 104, labeled ~wren. The tilde (~) indicates a low asserting signal. Load control 102 is held in reset while selected data enable 96 is not asserted. Load control 102 is also operative to latch selected data 92 to produce latched data 103 and assert write enable 104 a short time after selected data enable 96 is asserted.

Avoiding clock glitch is now described. Glitching on selected clock 100 may occur when a different adapter 46 has been selected due to a change in selection signal 64. The change in selection signal 64 also causes a new selected data enable 96 to be passed to load control 102. Since the newly selected adapter 46 will assert data enable 86 only after being selected, selected data enable 96 is unasserted following a switch to a new link 48 and, therefore, any glitch in selected clock 100 occurs while load control 102 is held in reset. This assures that load control 102 will not be affected by clock glitches due to switching between links.

First-in, first-out (FIFO) buffer 106 accepts latched data 103 clocked in by selected clock 100 when write enable 104 and selected data enable 96 are asserted. Buffer 106 outputs buffered data 108 clocked by local clock 70 upon reception of read enable signal 110, labeled ~ren. Since elements downstream of buffer 106 are clocked by local clock 70, clock glitches caused by selecting a different link 48 do not affect the operation of hub 60. Buffer 106 deasserts empty flag signal 112, labeled ~ef, when the FIFO load starts. This initiates the unload operation.

In a preferred embodiment, local clock 70 is generated by oscillator 114. In the illustrative example, oscillator 114 and all group clock signals 84 operates at 100 megahertz. Buffer 106 operates with 64 registers arranged to function in a first-in, first out manner.

Additional logic including assembler 116, error correction and detection unit 118, and format decoder 120 place data in a format for use by the remainder of cache 44. Assembler 116 accepts three 24-bit words from buffer 106 and constructs a 72-bit wide parallel data word 122. Wide parallel data word 122 consists of 64 data bits and 8 null bits. Because three words are used to form wide parallel data word 122, clock divider 124 divides local clock 70 by three for downstream operations. Assembler 116 also generates read enable 110 to indicate readiness to cause buffer 106 to unload buffered data 108.

Error correction and detection unit 118 detects errors in wide parallel data word 122 and, if possible, corrects these errors. In a preferred embodiment, error correction and detection unit 118 comprises and EDAC chip and a CRC (cyclic redundancy code) chip.

Format decoder 120 accepts wide parallel data word 122 and frame commands on frame command bus 88. Format decoder 120 decodes memory address and mode information contained in the downlink frames. Format decoder 120 also identifies the field type, stores the current mode, and outputs control signals 126 used in other sections of cache 44.

The illustrative system described above is meant as an example. Various blocks may be combined or further divided. Also, factors such as the number of serial data links received, the width of parallel data paths, clock speeds, and other design variables may be modified within the scope and spirit of the present invention.

Figure 5:
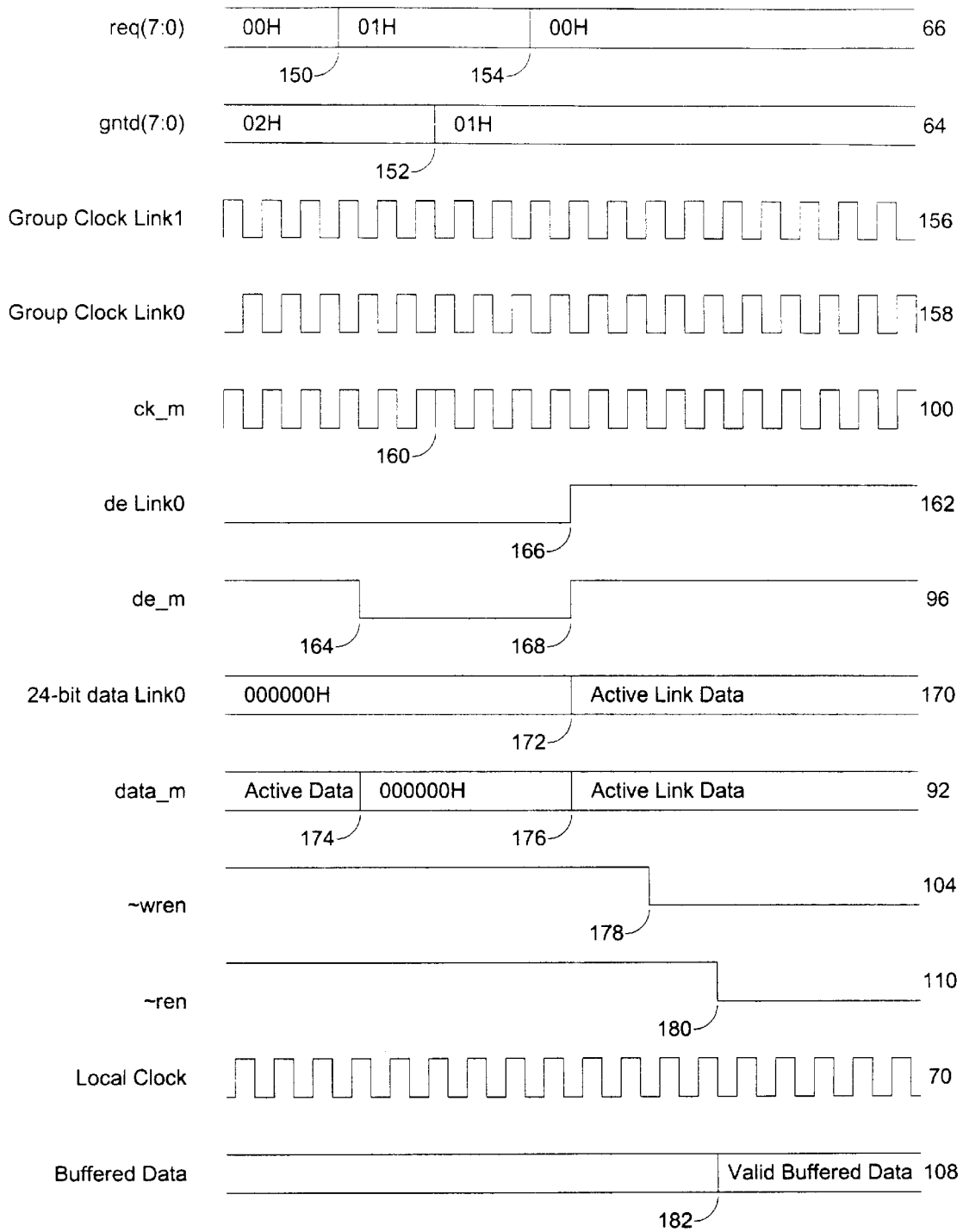
FIG. 5 is a timing diagram for the illustrative system according to the present invention.

Referring now to FIG. 5, a timing diagram for the illustrative system according to the present invention is shown. The timing diagram is provided to illustrate the operation of an embodiment of the present invention over a limited period of time. Hence, the timing diagram does not show all facets of the present invention and is not meant to limit the present invention to the described operations.

For this illustrative example, serial cache 44 includes eight adapters 46. Each adapter attempts to gain access to hub receiving section 60 by asserting a bit corresponding to the adapter number in request signal 66, labeled req(7:0). If access is granted, the bit corresponding to the adapter number in selection signal 64, labeled gntd(7:0), is asserted.

In FIG. 5, Adapter 1 initially has been granted access, as indicated by having bit 1 set in gntd(7:0) 64 resulting in 02H. The "H" indicates that the number is in hexadecimal. At a time indicated by 150, Adapter 0 asserts the 0 bit in req(7:0) 66. Eventually, this request is granted by controller 62, as indicated by gntd(7:0) 64 changing to 01H at 152. At some time after being granted permission to transmit, Adapter 0 releases it request, as indicated at 154.

The timing diagram indicates a clocking indeterminacy resulting from switching access from Adapter 1 to Adapter 0. The group clock signal from Adapter 1 is shown as 156. The group clock signal from Adapter 0 is shown as 158. The selected clock signal 100, ck_m, is initially the Adapter 1 clock signal 156. When Adapter 0 is granted access, selected clock signal 100 becomes Adapter 0 clock signal 158. Since, for this example, clocks 156 and 158 are 180 degrees out of phase, an indeterminacy exists, as indicated at 160.

Clock switching problems are prevented from affecting serial cache 44 by using the data enable signal from the selected adapter to keep load control 102 reset during clock switching. The data enable signal from Adapter 0 is shown by 162. The selected data enable 96, labeled de_m, initially reflects the data enable for Adapter 1. At some time previous to when Adapter 0 is granted access, data enable for Link 1 becomes unasserted, as shown at 164 on selected data enable 96. At some time after having been granted access, Adapter 0 begins transmitting data and asserts Link 0 data enable 162, as shown at 166. This causes selected data enable 96 to be asserted, as shown at 168.

The data transmitted on Link 0 is indicated by signal 170. Initially, Adapter 0 is not transmitting, as indicated by the 24-bit zero value. When Link 0 data enable 162 is asserted, active data is sent, as shown at time 172. Selected data 92 initially reflects active link data from Adapter 1. This data ceases to be active when Link 1 data enable becomes unasserted at 164. When Adapter 0 is granted access, selected data 92 reflects the value of Link 0 data 170, indicated at 174. When Adapter 0 asserts data enable 162, selected data 92 is the active data on Link 0 data 170, indicated at 176.

After load control 102 receives active data, write enable 104, labeled ~wren, is asserted, indicated at 178. When write enable 104 is asserted, data is clocked into buffer 106 by selected clock 100. When assembler 116 is ready to receive data, receive enable 110, labeled ~ren, is asserted, indicated at 180. When receive enable 110 is asserted, buffered data 108 is clocked out of buffer 106 by local clock 70, as indicated at 182.

While the best modes for carrying out the invention has been described in detail, those familiar with the art to which this invention relates will recognize various alternative designs and embodiments for practicing the invention as defined by the following claims.

What is claimed is:

1. A system for multiplexing a plurality of serial links, each link connecting one of a plurality of transmitters to a hub, each link including one or more serial channels and a serial clock signal, serial data is clocked on the one or more serial channels by the serial clock signal, the serial clock signal in each link is not synchronized with the serial clock signal in other links, the system comprising:

a select signal for determining which of the plurality of serial links is being read by the hub;

a plurality of group serial receivers, each group serial receiver connected to a corresponding serial link, wherein the group serial receiver is operable to perform serial to parallel conversion of data sent over the serial link, to output a group clock signal based on the serial clock signal, to output parallel data clocked by the group clock signal, the parallel data representing the converted serial data, and to determine a data enable signal from the serial link, the data enable signal indicating active data on the serial link;

a first multiplexer in communication with each of the plurality of group serial receivers and the select signal, the first multiplexer operative to output selected data as the parallel data of the group serial receiver corresponding to the value of the select signal;

a second multiplexer in communication with each of the plurality of group serial receivers and the select signal, the second multiplexer operative to output a selected clock signal as the group clock signal of the group serial receiver corresponding to the value of the select signal;

a third multiplexer in communication with each of the plurality of group serial receivers and the select signal, the third multiplexer operative to output a selected data enable signal as the data enable signal of the group serial receiver corresponding to the value of the select signal;

a load control in communication with the first multiplexer, the second multiplexer, and the third multiplexer, the load control operative to latch the selected data and to output the latched data clocked by the selected clock signal if the selected data enable signal is asserted, otherwise the load control operative to hold in reset if the selected data enable signal is not asserted;

a local clock, the local clock producing a local clock signal which is not synchronized with the selected clock signal; and a first-in, first-out buffer in communication with the load control, the second multiplexer, the third multiplexer, and the local clock, the buffer operative to load the latched data from the load control clocked by the selected clock signal from the second multiplexer and to unload the selected data clocked by the local clock signal.

2. The system for multiplexing a plurality of serial links as in claim 1, wherein each of the plurality of transmitters can send frame information to the hub, each group serial receiver further operative to detect when frame information has been sent to the hub and to generate a frame command.

3. The system for multiplexing a plurality of serial links as in claim 2 further comprising a first control logic in communication with each of the group serial receivers, the first control logic operable to output a parallel word corresponding to the frame command.

4. The system for multiplexing a plurality of serial links as in claim 1 further comprising a second control logic in communication with the buffer and the local clock, the second control logic operative to read a sequence of data words from the buffer and to form a wide parallel data word from the sequence of data words.

5. The system for multiplexing a plurality of serial links as in claim 4, the second control logic further operative to perform error detection and correction on the wide parallel data word.

6. A method for multiplexing a plurality of serial links, each link connecting one of a plurality of transmitters to a hub, each link including one or more serial channels and a serial clock signal, serial data is clocked on the one or more serial channels by the serial clock signal, the serial clock signal in each link is not synchronized with the serial clock signal in other links, the method comprising:

for each link, determining a parallel data signal corresponding to the serial data sent on the one or more serial channels;

for each link, determining a group clock signal with a period equal to a multiple of periods of the serial clock signal;

selecting a serial link to be read by the hub;

determining a selected data signal as the parallel data signal from the selected serial link;

determining a selected clock signal as the group clock signal from the selected serial link;

loading the selected data signal into a buffer using the selected clock signal;

generating a local clock signal; and unloading the selected data signal from the buffer using the local clock signal.

7. The method for multiplexing a plurality of serial links as in claim 6 further comprising:

for each link, determining a data enable signal indicating active parallel data from the link; and determining a selected data enable signal as the data enable signal from the selected serial link.

8. The method for multiplexing a plurality of serial links as in claim 7, wherein loading the selected data signal into a buffer using the selected clock signal comprises:

loading the selected data signal into a buffer using the selected clock signal when the selected data enable signal is asserted, otherwise;

holding in reset when the selected data enable signal is unasserted.

9. The method for multiplexing a plurality of serial links as in claim 6 further comprising forming a wide parallel data word from a sequence of unloaded selected data.

10. The method for multiplexing a plurality of serial links as in claim 9 further comprising performing error detection and correction on the wide parallel data word.

* * * * *